United States Patent
Lu

(10) Patent No.: US 10,150,568 B2
(45) Date of Patent: Dec. 11, 2018

(54) THRUST REVERSER COMPRESSION ROD WITH SPRING BIASED ENGAGEMENT

(71) Applicant: Rohr, Inc., Chula Vista, CA (US)

(72) Inventor: Jacques Lu, Murrieta, CA (US)

(73) Assignee: ROHR, INC., Chula Vista, CA (US)

( * ) Notice: Subject to any disclaimer, the term of this patent is extended or adjusted under 35 U.S.C. 154(b) by 275 days.

(21) Appl. No.: 15/008,123

(22) Filed: Jan. 27, 2016

(65) Prior Publication Data

US 2017/0211512 A1 Jul. 27, 2017

(51) Int. Cl.
| | | |
|---|---|---|
| *B64D 29/00* | (2006.01) | |
| *B64D 33/04* | (2006.01) | |
| *F02K 1/80* | (2006.01) | |
| *B64D 29/06* | (2006.01) | |
| *F01D 25/26* | (2006.01) | |
| *F01D 25/28* | (2006.01) | |
| *F02K 1/64* | (2006.01) | |

(52) U.S. Cl.
CPC ............. *B64D 29/00* (2013.01); *B64D 29/06* (2013.01); *B64D 33/04* (2013.01); *F01D 25/265* (2013.01); *F01D 25/28* (2013.01); *F02K 1/64* (2013.01); *F02K 1/80* (2013.01); *F02K 1/805* (2013.01); *F05D 2230/64* (2013.01); *F05D 2240/14* (2013.01); *F05D 2260/52* (2013.01)

(58) Field of Classification Search
CPC ........ B64D 29/00; B64D 29/06; B64D 33/04; F01D 25/04; F01D 25/265; F01D 25/28; F02K 1/64; F02K 1/70; F02K 1/72; F02K 1/74; F02K 1/80; F02K 1/805; F05D 2230/64; F05D 2240/14; F05D 2260/52
See application file for complete search history.

(56) References Cited

U.S. PATENT DOCUMENTS

| | | | | |
|---|---|---|---|---|
| 4,679,750 A * | 7/1987 | Burhans | ................. | B64D 29/06 244/129.4 |
| 4,683,717 A * | 8/1987 | Naud | ..................... | B64D 29/08 60/226.1 |
| 5,709,516 A | 1/1998 | Peterson | | |
| 7,617,685 B2 | 11/2009 | Norman | | |
| 8,726,675 B2 | 5/2014 | Hand | | |
| 9,932,855 B2 * | 4/2018 | Byrne | ..................... | F01D 25/04 |
| 2006/0038065 A1 * | 2/2006 | Howe | ..................... | B64D 27/26 244/54 |
| 2009/0165463 A1 * | 7/2009 | Vauchel | ................. | B64D 29/00 60/797 |
| 2010/0284806 A1 * | 11/2010 | Vauchel | ................. | B64D 29/06 415/214.1 |
| 2015/0322890 A1 | 11/2015 | Lu | | |
| 2016/0010502 A1 * | 1/2016 | Byrne | ..................... | B64D 33/00 415/213.1 |
| 2017/0002684 A1 * | 1/2017 | Byrne | ..................... | B64D 33/00 |

* cited by examiner

*Primary Examiner* — Scott Walthour
(74) *Attorney, Agent, or Firm* — Snell & Wilmer L.L.P.

(57) ABSTRACT

An arrangement may comprise a spring member. A proximal end and a distal end of a compression rod may contact engagement features via the spring member in a core cowl of a gas turbine engine. The compression rod may transmit loads between halves of the core cowl. The spring member may compress and decompress in response to vibrations or other relative movement between halves of the core cowl.

15 Claims, 9 Drawing Sheets

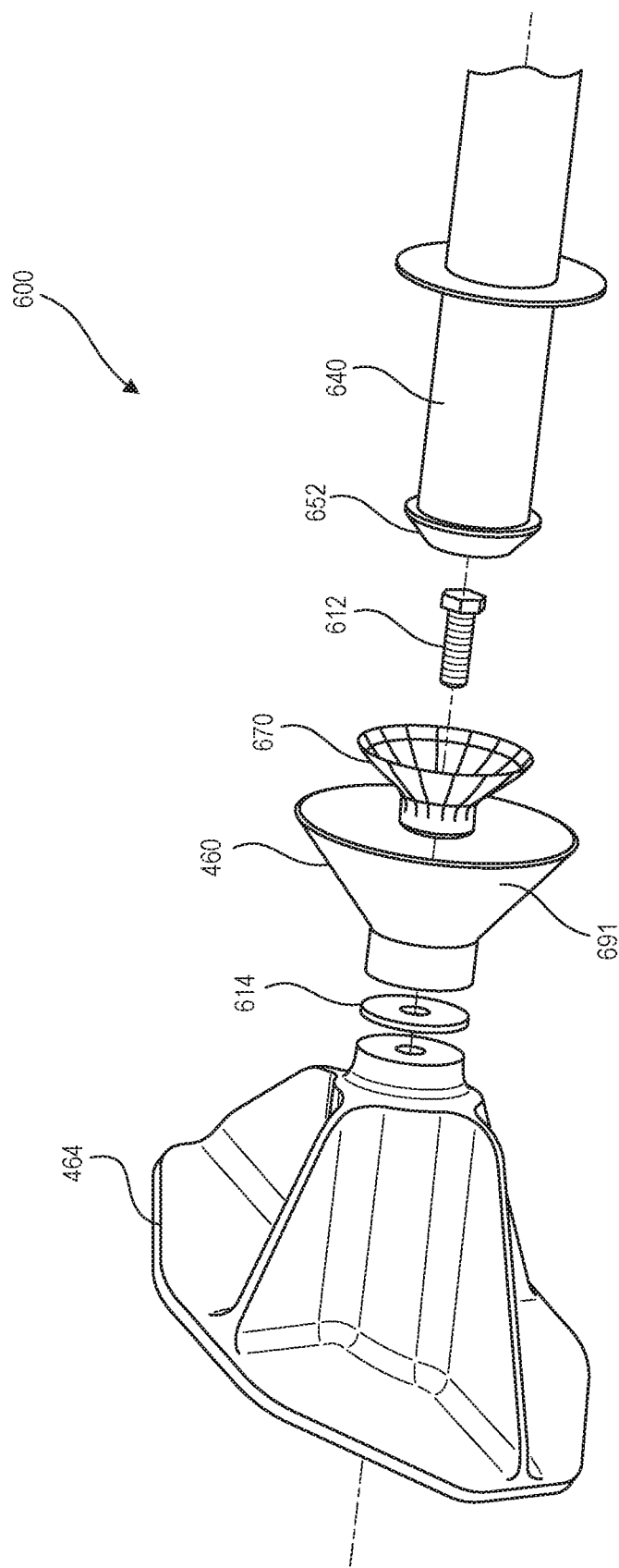

THRUST REVERSER COMPRESSION ROD WITH SPRING BIASED ENGAGEMENT

FIELD

The invention generally relates to gas turbine propulsion systems for commercial aircraft, and more particularly to the design of compression rods used for mounting thrust reverser halves.

BACKGROUND

Modern aircraft may utilize one or more gas turbine engines. A gas turbine engine may be housed in a nacelle. Often, the nacelle includes a thrust reverser. The thrust reverser includes an inner fixed structure (IFS) surrounding the engine which forms the interior surface of a bypass air duct through the thrust reverser. The IFS defines a core compartment that surrounds the engine. During various operating conditions, such as during reverse thrust, pressure in the duct is greater than the pressure in the core compartment around the engine. In these conditions, two IFS halves may be pushed together, i.e. inward toward the engine. In certain cases, this load may be reacted with a compression rod that extends between the two IFS halves.

SUMMARY

An aircraft nacelle is disclosed. An aircraft nacelle may comprise: a first half comprising a first engagement feature, and a second half comprising a second engagement feature, wherein the first half and the second half are rotatable about a hinge between a closed position in which the first half and the second half enclose a portion of an aircraft engine, and an open position in which the first half and the second half are separated and allow access to the portion of the aircraft engine; a compression rod comprising: a proximal end and a distal end, wherein in response to the aircraft nacelle being in the closed position, the proximal end is in contact with the first engagement feature and the distal end is in contact with the second engagement feature; a first spring member located between the compression rod and the first engagement feature; and a second spring member located between the compression rod and the second engagement feature, wherein, in response to the aircraft nacelle being in the closed position, the first spring member and the second spring member are in a compressed position.

In various embodiments, at least a portion of the first spring member may be perimetrically surrounded by the first engagement feature and at least a portion of the second spring member may be perimetrically surrounded by the second engagement feature. The first spring member may be fastened to the first engagement feature and the second spring member is fastened to the second engagement feature. A first engagement member may be coupled to the proximal end and a second engagement member may be coupled to the distal end. In response to the first half being rotated about the hinge to the closed position, the first engagement member may be configured to engage the first engagement feature and in response to the second half being rotated about the hinge to the closed position, the second engagement member may be configured to engage the second engagement feature. At least one of the first engagement member and the second engagement member may comprise at least one of a cap or a button end. The first spring member and the second spring member may comprise a plurality of leaf springs. The plurality of leaf springs may be arranged in a conical shape. The aircraft nacelle may further comprise a pylon bracket, wherein the compression rod may be located within the pylon bracket. The first engagement feature may comprise a first cone coupled to a first half of a core cowl, and the second engagement feature may comprise a second cone coupled to a second half of the core cowl.

An arrangement for an aircraft nacelle may comprise: an engagement feature configured to be coupled to at least one of a first half or a second half of the nacelle, the first half and the second half being rotatable about a hinge between a closed position in which the first half and the second half enclose a portion of an aircraft engine, and an open position in which the first half and the second half are separated and allow access to the portion of the aircraft engine; a compression rod comprising a proximal end and a distal end, the compression rod configured to be coupled between the first half and the second half in response to the nacelle being in the closed position; a spring member located between the engagement feature and the compression rod, wherein in response to the aircraft nacelle moving to the closed position, the spring member is compressed between at least one of the proximal end and the distal end of the compression rod and the engagement feature.

In various embodiments, the spring member may comprise a washer defining an aperture having a centerline axis for receiving a fastener, and a plurality of leaf springs extending from the washer, the plurality of leaf springs configured to bend away from the centerline axis in response to the aircraft nacelle moving to the closed position and configured to bend towards the centerline axis in response to the aircraft nacelle moving to the open position. The plurality of leaf springs may comprise between 2 and 32 leaf springs. The plurality of leaf springs may comprise between 8 and 24 leaf springs. At least a portion of at least one of the plurality of leaf springs may be located in closer proximity to the centerline axis than an adjacent leaf spring.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 6A illustrates an exploded view of a compression rod arrangement for a nacelle, in accordance with various embodiments;

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods for an arrangement for a nacelle and more specifically for an arrangement which includes a spring member are disclosed in accordance with various embodiments. As described above, a thrust reverser may include a duct with an inner wall that surrounds and forms a core compartment around the engine. Variations in air pressure in the duct and in the core compartment may result in forces that need to be reacted. One method of reacting these forces in use on commercial airliners today is a compression rod. The compression rod contacts engagement points on each thrust reverser half to take compression loads between them. Because the compression rod and the associated thrust reverser structure around the attachment points is basically rigid, and because the structures in the thrust reverser system are large and as a result have large tolerances, it can be difficult to make sure the compression rod ends contact the thrust reverser half engagement points at the right time when the halves are closing to generate the desired pre-load and ensure good contact. Time consuming and skill-intensive rigging using shims and other adjustment schemes is often necessary when mounting a thrust reverser on a propulsion system in order to ensure that the compression rod engagements occur as intended. This invention includes a spring element between the compression rod ends and the thrust reverser engagement points in order to better ensure the right engagement and take-up some of the engagement gap tolerance, avoiding any loose fit and rattling or vibration between the parts which could result in wear.

Figure 1:
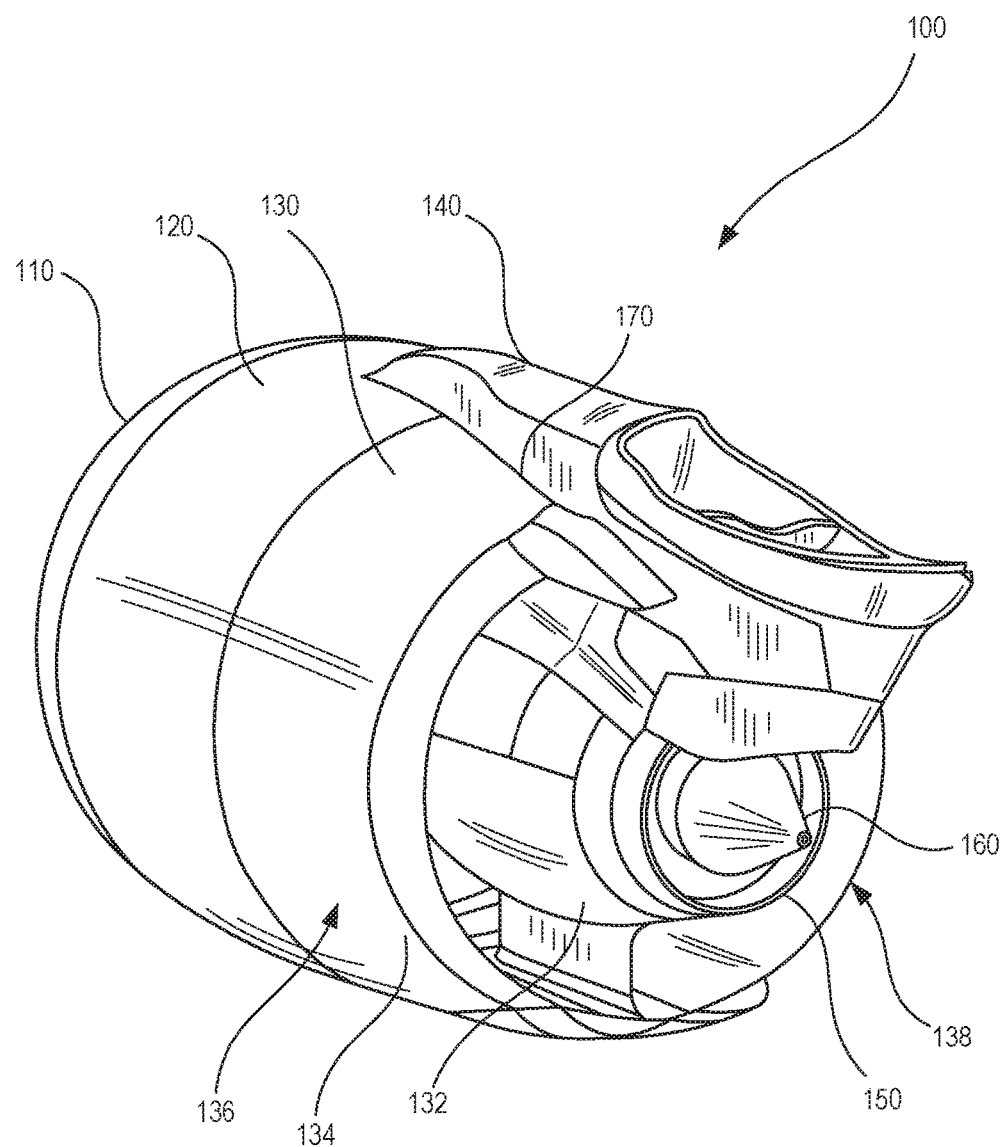
FIG. 1 illustrates a perspective view of a nacelle, in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132 and an outer fixed structure ("OFS") 134. The aft portion of the IFS 132 may be constructed as a core cowl (further described below). Bypass air from an engine fan may flow between the IFS 132 and the OFS 134 in a bypass air duct, and exits the duct at a nozzle formed generally between the IFS and OFS to provide the majority of the thrust. Nozzle 150 may surround a centerbody 160, between which the engine exhaust stream exits to provide additional thrust. The thrust reverser 130 may further be split into a left half 136 and a right half 138. The left half 136 and the right half 138 may be hinged to the pylon 140 at hinges 170. The left half 136 and the right half 138 may hinge open at hinges 170 in order to provide access to the engine.

Figure 2:
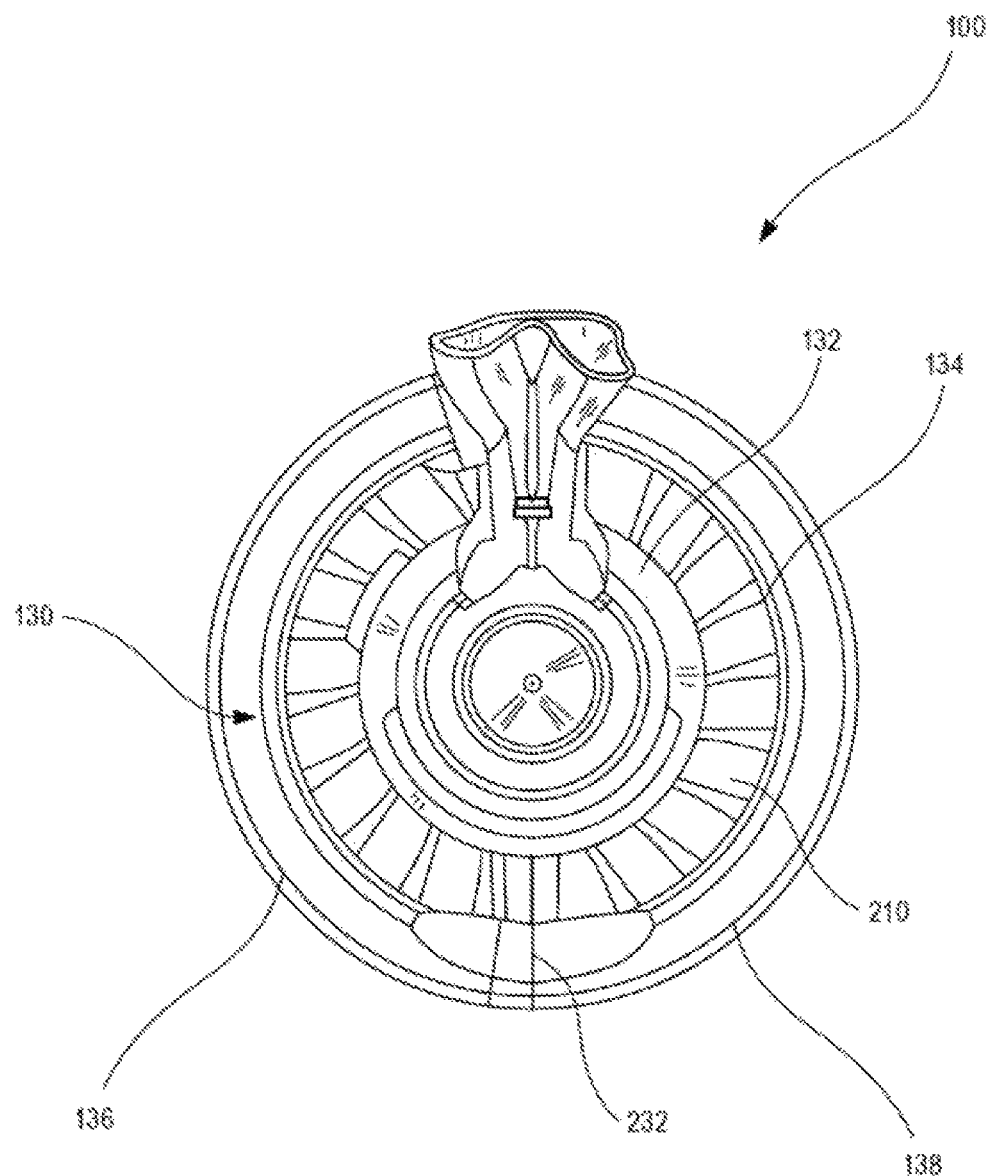
FIG. 2 illustrates an aft view of a nacelle in a closed position, in accordance with various embodiments.

Referring to FIG. 2, an aft view of nacelle 100 in a closed position is illustrated according to various embodiments. Left half 136 and right half 138 of thrust reverser 130 may be split along split line 232. Engine fan 210 is visible through the bypass air duct.

Figure 3:
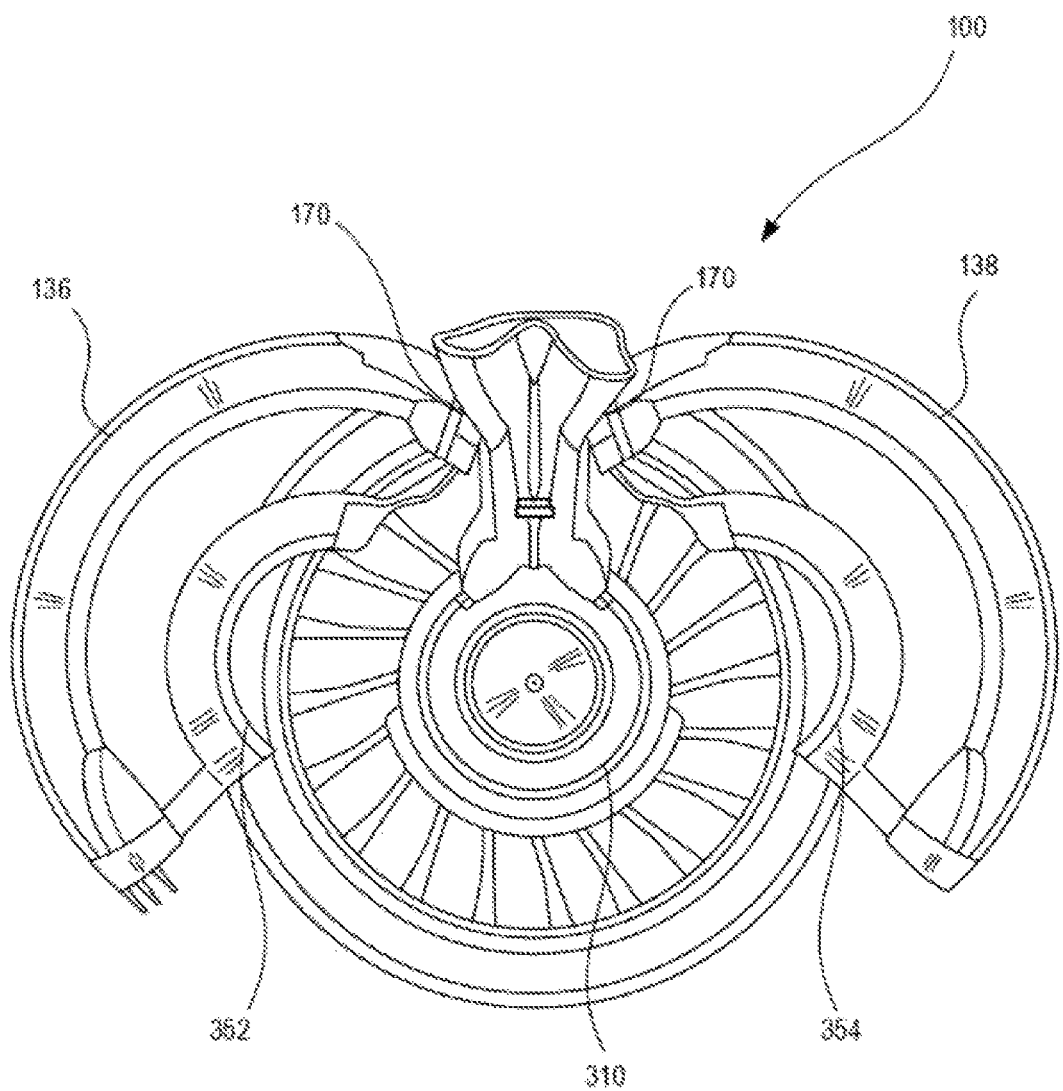
FIG. 3 illustrates an aft view of a nacelle in an open position, in accordance with various embodiments.

Referring to FIG. 3, an aft view of nacelle 100 with the thrust reverser halves 136, 138 hinged open is illustrated according to various embodiments. Thrust reverser halves 136, 138 and core cowl halves 352, 354 are hinged open at hinges 170 in order to provide access to engine 310.

Figure 4:
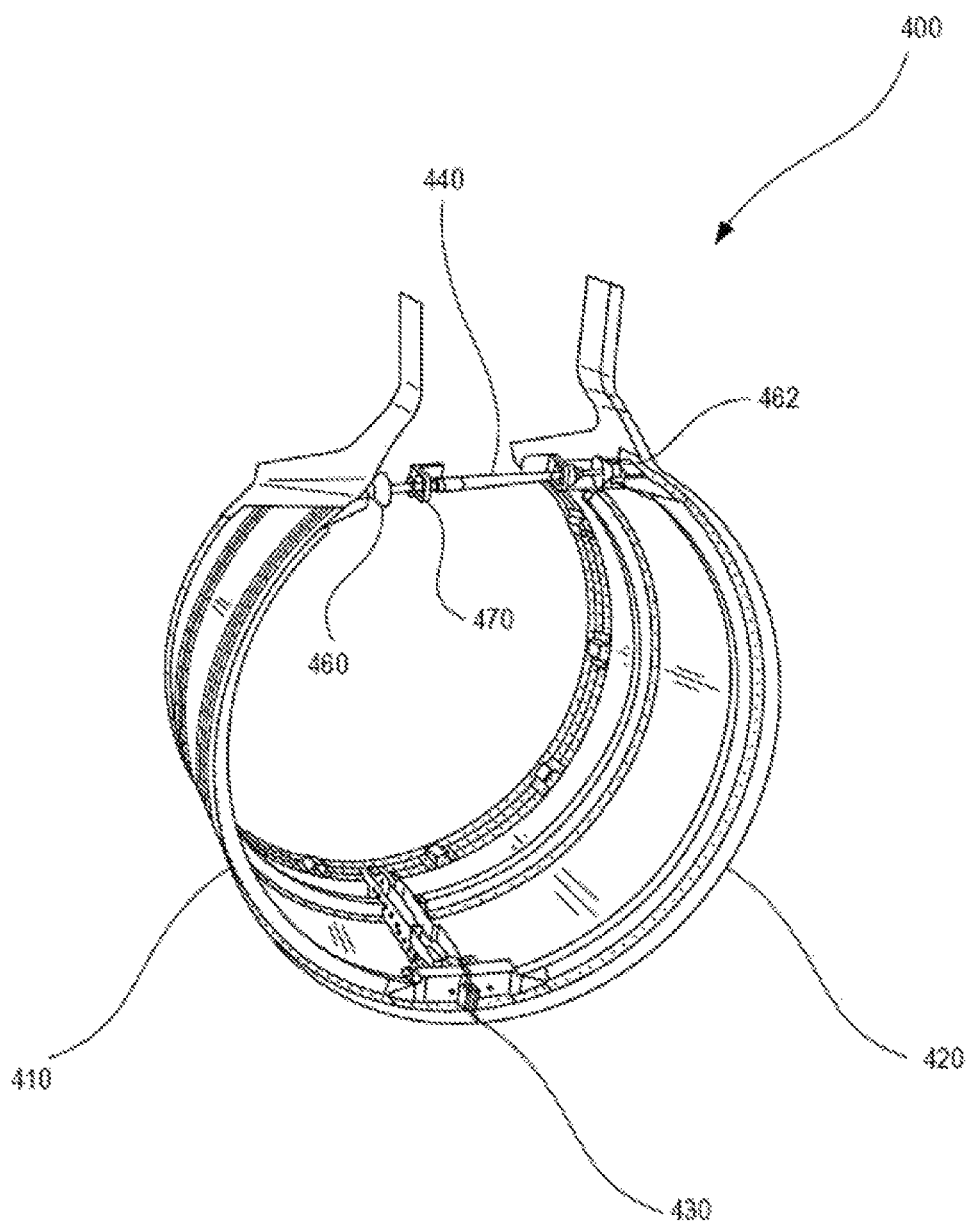
FIG. 4 illustrates a perspective view of a core cowl, in accordance with various embodiments.

Referring to FIG. 4, a perspective view of a core cowl 400 is illustrated according to various embodiments, which shows an exemplary location on a thrust reverser where a compression rod may be used. In various embodiments, one or more compression rods 440 may be located at any position in a thrust reverser and may transmit loads between halves of the thrust reverser. A left half 410 and a right half 420 of core cowl 400 may be split along split line 430. A compression rod 440 may be configured to transmit loads between left half 410 and right half 420. The compression rod 440 may be mounted within mounting brackets (also referred to herein as pylon brackets) 470. The mounting brackets 470 may be coupled to a pylon. The compression rod 440 may contact left half 410 and right half 420 at engagement features 460, 462. In various embodiments, engagement features 460, 462 may be engagement cones. Engagement features 460, 462 may be coupled respectively to left half 410 and right half 420.

In response to left half 410 and right half 420 of core cowl 400 hinging open, compression rod 440 may disengage from engagement features 460, 462. Compression rod 440 may be retained by mounting brackets 470.

Figure 5:
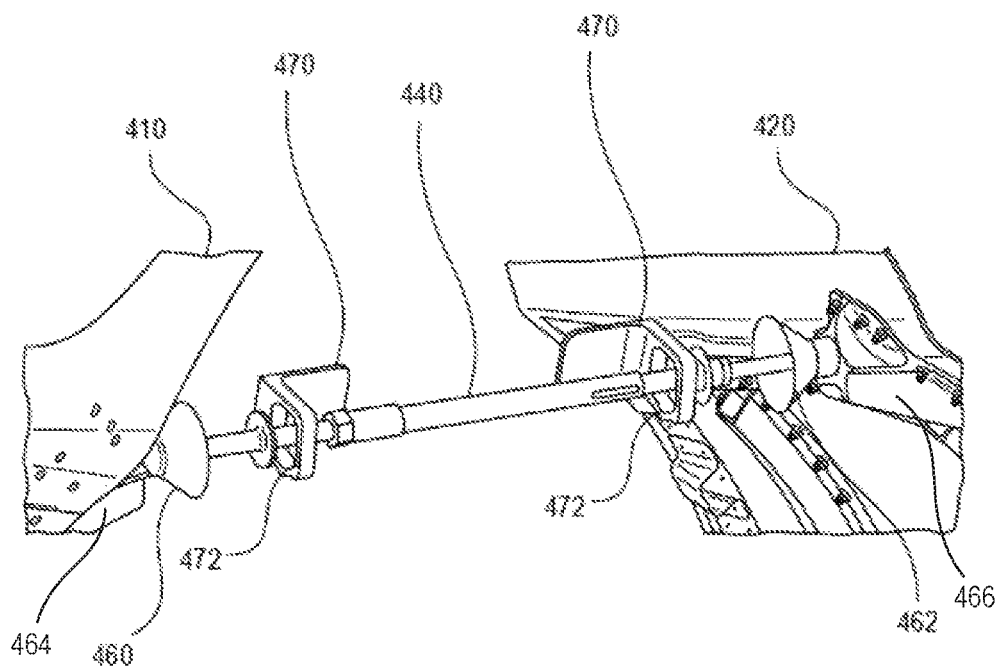
FIG. 5 illustrates a perspective view of a compression rod, in accordance with various embodiments.

Referring to FIG. 5, a perspective view of compression rod 440 is illustrated according to various embodiments. Mounting brackets 470 may comprise apertures 472 which are larger in diameter than compression rod 440, which may allow movement of compression rod 440 within mounting brackets 470. In response to left half 410 and right half 420 hinging closed, compression rod 440 may engage engagement features 460, 462. First mounting member 464 may be attached to left half 410. Engagement feature 460 may be coupled to first mounting member 464. Second mounting member 466 may be attached to right half 420. Engagement feature 462 may be coupled to second mounting member 466.

Referring to FIG. 6A, arrangement 600 for a nacelle is illustrated with only a portion of compression rod 640 shown, in accordance with various embodiments. Arrangement 600 may include engagement feature 460 and spring member 670. Spring member 670 may be located between compression rod 640 and engagement feature 460. Engagement feature 460 may be referred to as and/or comprise a bumper cup. Engagement feature 460 may comprise a conical geometry. Engagement feature 460 may comprise a cone 691. Spring member 670 may be referred to herein as a spring washer. Spring member 670 may comprise a conical geometry or shape. Arrangement 600 may further include fastener 612, compression rod 640, washer/shim 614, and/or mounting member 464. Fastener 612 may comprise a bolt, screw, or the like. Spring member 670 may be configured to receive compression rod 640. More specifically, spring member 670 may be configured to engage engagement member 652 of compression rod 640. Engagement member 652 may be coupled to a proximal or distal end of compression rod 640. Engagement member 652 may comprise a cap of compression rod 640. Engagement member 652 may be referred to as and/or comprise a button end. Fastener 612 may be configured to fasten spring member 670, engagement feature 460, and washer/shim 614 to mounting member 464.

Figure 6B:
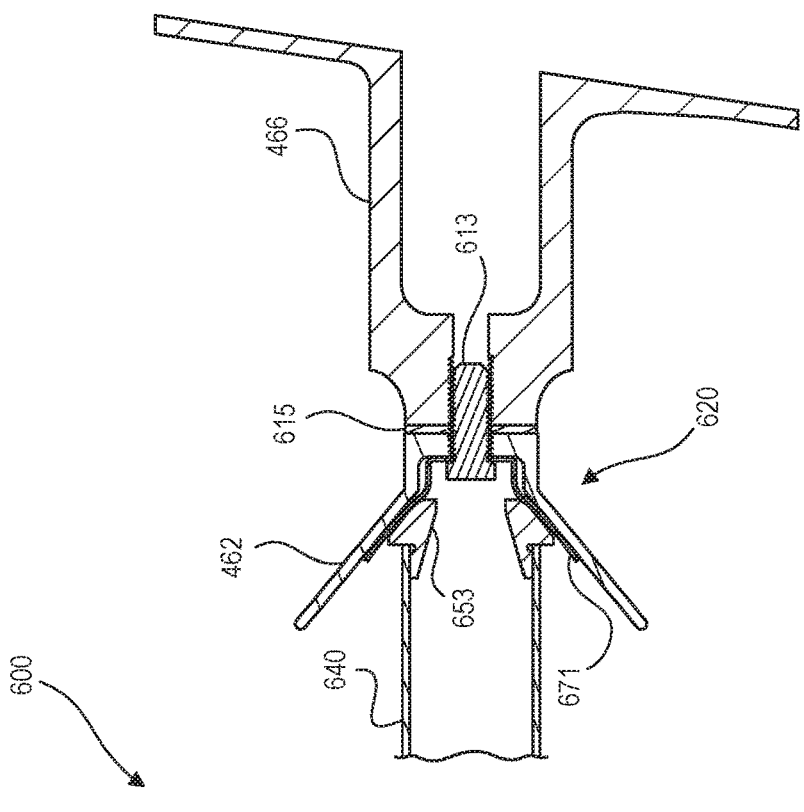
FIG. 6B illustrates a cross-section view of a compression rod arrangement for a nacelle in a closed position and having a spring member in a compressed position, in accordance with various embodiments.
Figure 6B:
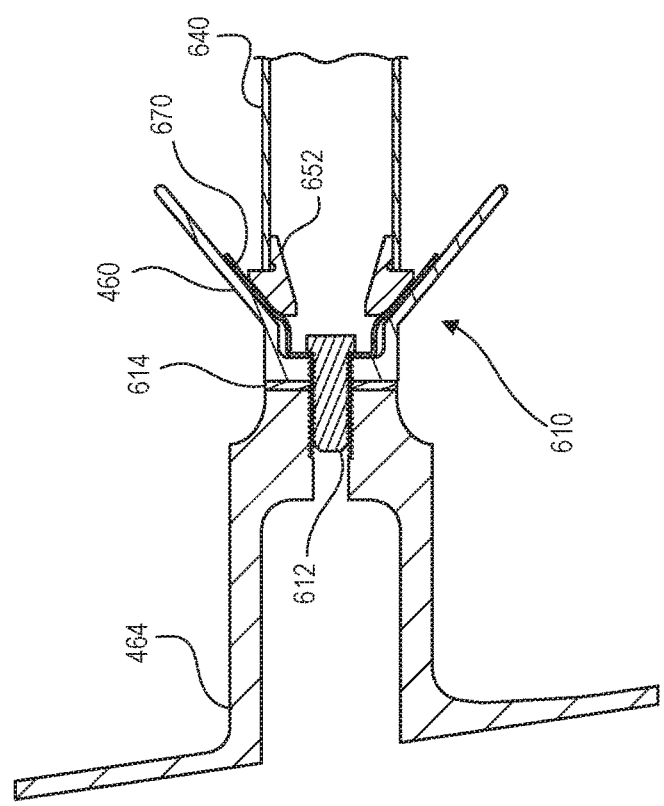

Referring to FIG. 6B, cross-section view of arrangement 600 is illustrated with proximal end 610 and distal end 620 of compression rod 640 being shown, according to various embodiments. Accordingly, compression rod 640 may comprise a proximal end 610 and a distal end 620. FIG. 6B illustrates spring member 670 and spring member 671 in a fully compressed stated. However, when properly adjusted, the thrust reverser halves may be positioned such that, when closed, the spring members (i.e., spring member 670 and spring member 671) are in a partially compressed or mostly compressed position.

As illustrated, engagement member 652 may contact spring member 670 and compress spring member 670 to a partially compressed or near maximum compressed position when arrangement 600 is in a closed position. Stated another way, in response to an aircraft nacelle being in a closed position, the proximal end 610 may be in contact with first engagement feature 460 via first spring member 670 and the distal end 620 is in contact with second engagement feature 462 via second spring member 671. In this fashion, spring member 670 may provide cushioning to compression rod 640, allowing movement of compression rod 640 while spring member 670 remains in contact with compression rod 640 via engagement member 652 during the movement. In this manner, a preload may be set on spring member 670 in response to arrangement 600 moving to a closed position. Thus, compression rod 640 and engagement feature 460 may move relative to each other a small amount while remaining in contact via spring member 670 which may prevent rattling or vibration which can result in wear. In this fashion, spring member 670 may provide damping to compression rod 640. As illustrated, first spring member 670 may be perimetrically surrounded by first engagement feature 460 and second spring member 671 may be perimetrically surrounded by second engagement feature 462 when arrangement 600 is in a closed position.

In various embodiments, a second engagement member 653 may be attached to distal end 620 of compression rod 640. A second spring member 671, second engagement feature 462, and a second washer/shim 615 may be fastened to second mounting member 466 via second fastener 613. Second engagement member 653, second spring member 671, second engagement feature 462, second washer/shim 615, and second mounting member 466 may be similar to first engagement member 652, first spring member 670, first engagement feature 460, first washer/shim 614, and first mounting member 464, respectively.

Figure 7A:
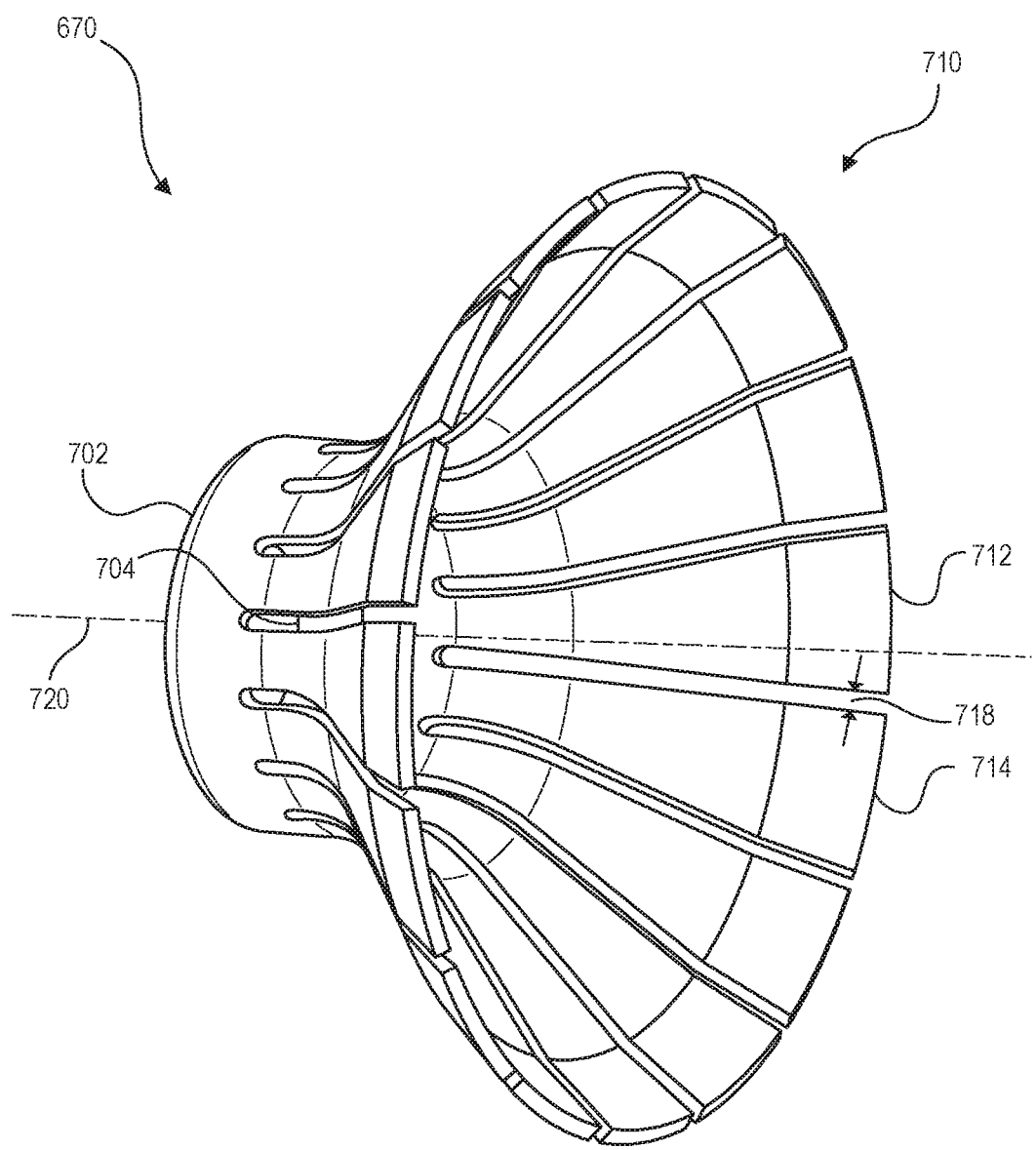
FIG. 7A illustrates a spring member, in accordance with various embodiments.

Referring to FIG. 7A, spring member 670 is illustrated, in accordance with various embodiments. Spring member 670 may comprise a washer 702 having an aperture 704 and a plurality of tabs (also referred to herein as leaf springs) 710, including tab 712 and tab 714. Tab 712 and tab 714 may be separated by a gap 718. Plurality of tabs 710 may extend away from plate 702. Spring member 670 may comprise a centerline axis 720. Plurality of tabs 710 may extend away from centerline axis 720. Plurality of tabs 710 may extend away from centerline axis 720 in a conical fashion. Plurality of tabs 710 may be configured to bend away from the centerline axis 720 in response to a member (e.g. a left half and/or a right) of an aircraft nacelle moving to a closed position. Plurality of tabs 710 may be configured to bend towards the centerline axis 720 in response to the member of the aircraft nacelle moving to an open position.

Figure 7B:
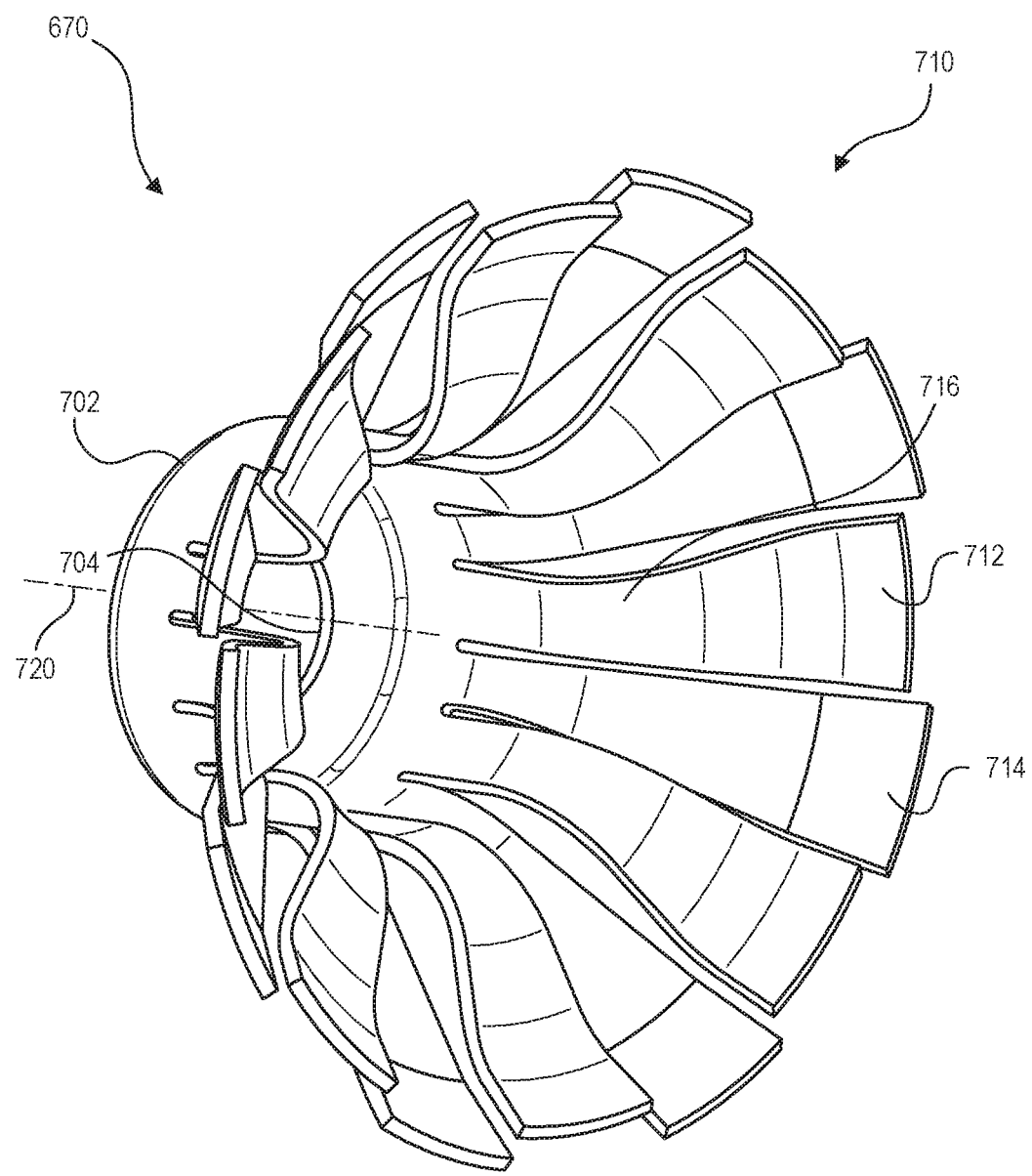
FIG. 7B illustrates a spring member, in accordance with various embodiments.

Referring to FIG. 7B, spring member 670 is illustrated, in accordance with various embodiments. In various embodiments, as illustrated, at least a portion (e.g. middle portion 716) of tab 712 may be located in closer proximity to the centerline axis 720 than an adjacent tab, such as tab 714, for example. Accordingly, plurality of tabs 710 may be arranged in an alternating fashion with every other tab having at least a portion of the tab located in closer proximity to centerline axis 720 than the adjacent tab. In this fashion, the tabs being located in closer proximity to the centerline axis 720 may be configured to engage a member (e.g., a compression rod) before the adjacent tabs. In this manner, the stiffness of each tab of plurality of tabs 710 may be different, in accordance with various embodiments. For example, the tabs being located in closer proximity to the centerline axis 720 may be less stiff than the adjacent tabs, or vice versa. In various embodiments, plurality of tabs 710 may comprise sixteen (16) tabs, as illustrated. In various embodiments, plurality of tabs 710 may comprise between 2 and 32 tabs. In various embodiments, plurality of tabs 710 may comprise between 8 and 24 tabs. In various embodiments, plurality of tabs 710 may comprise between 14 and 18 tabs. However, it is contemplated that plurality of tabs 710 may comprise any suitable number of tabs.

In various embodiments, spring member 670 may comprise a metal allow such as steel or copper, for example.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. An aircraft nacelle comprising:
   a first half of the aircraft nacelle comprising a first engagement feature, and a second half of the aircraft nacelle comprising a second engagement feature, wherein the first half of the aircraft nacelle and the second half of the aircraft nacelle are each rotatable about a respective hinge between a closed position and an open position, wherein the first half of the aircraft nacelle and the second half of the aircraft nacelle are engaged and enclose a portion of an aircraft engine when the first half of the aircraft nacelle and the second half of the aircraft nacelle are each in the closed position, and wherein the first half of the aircraft nacelle and the second half of the aircraft nacelle are separated and allow access to the portion of the aircraft engine when the first half of the aircraft nacelle and the second half of the aircraft nacelle are each in the open position;
   a compression rod comprising a proximal end and a distal end;
   a first spring member located between the compression rod and the first engagement feature; and
   a second spring member located between the compression rod and the second engagement feature;
   wherein, in response to the first half of the aircraft nacelle and the second half of the aircraft nacelle each being in the closed position, the proximal end is in contact with the first engagement feature via the first spring member, to thereby compress the first spring member, and the distal end is in contact with the second engagement feature via the second spring member, to thereby compress the second spring member.

2. The aircraft nacelle of claim 1, wherein at least a portion of the first spring member is perimetrically surrounded by the first engagement feature and at least a portion of the second spring member is perimetrically surrounded by the second engagement feature.

3. The aircraft nacelle of claim 1, wherein the first spring member is fastened to the first engagement feature and the second spring member is fastened to the second engagement feature.

4. The aircraft nacelle of claim 1, wherein a first engagement member is coupled to the proximal end of the compression rod and a second engagement member is coupled to the distal end of the compression rod.

5. The aircraft nacelle of claim 4, wherein, in response to the first half of the aircraft nacelle being rotated about the hinge to the closed position, the first engagement member is configured to engage the first engagement feature and, in response to the second half of the aircraft nacelle being rotated about the hinge to the closed position, the second engagement member is configured to engage the second engagement feature.

6. The aircraft nacelle of claim 5, wherein at least one of the first engagement member and the second engagement member comprises a button end.

7. The aircraft nacelle of claim 1, wherein the first spring member and the second spring member each comprise a respective plurality of leaf springs.

8. The aircraft nacelle of claim 7, wherein each respective plurality of leaf springs is arranged in a conical shape.

9. The aircraft nacelle of claim 1, further comprising a pylon bracket, wherein the compression rod is located within the pylon bracket.

10. The aircraft nacelle of claim 1, wherein the first engagement feature comprises a first cone coupled to a first half of a core cowl, and wherein the second engagement feature comprises a second cone coupled to a second half of the core cowl.

11. An aircraft nacelle comprising:
    an engagement feature coupled to a respective one of a first half of the aircraft nacelle of the aircraft nacelle or a second half of the aircraft nacelle, the first half of the aircraft nacelle and the second half of the aircraft nacelle each being rotatable about a respective hinge between a closed position and an open position, wherein the first half of the aircraft nacelle and the second half of the aircraft nacelle are engaged and enclose a portion of an aircraft engine when the first half of the aircraft nacelle and the second half of the aircraft nacelle are each in the closed position, and wherein the first half of the aircraft nacelle and the second half of the aircraft nacelle are separated and allow access to the portion of the aircraft engine when the first half of the aircraft nacelle and the second half of the aircraft nacelle are each in the open position;
    a compression rod comprising a proximal end and a distal end, the compression rod coupled to each of the first half of the aircraft nacelle and the second half of the aircraft nacelle in response to the first half of the aircraft nacelle and the second half of the aircraft nacelle each being in the closed position; and
    a spring member located between the engagement feature and the proximal end of the compression rod or between the engagement feature and the distal end of the compression rod, wherein, in response to the first half of the aircraft nacelle and the second half of the aircraft nacelle each being in the closed position, the spring member is compressed between the compression rod and the engagement feature;
    wherein the spring member comprises a plurality of leaf springs configured to bend away from a centerline axis of the spring member in response to the first half of the aircraft nacelle and the second half of the aircraft nacelle each being in the closed position, the plurality of leaf springs being further configured to bend towards the centerline axis in response to the first half of the aircraft nacelle and the second hall of the aircraft nacelle each being in the open position.

12. The aircraft nacelle of claim 11, wherein the spring member further comprises a washer defining an aperture for receiving a fastener, wherein the plurality of leaf springs extend from the washer.

13. The aircraft nacelle of claim 11, wherein the plurality of leaf springs comprise between 2 and 32 leaf springs.

14. The aircraft nacelle of claim 13, wherein the plurality of leaf springs comprise between 8 and 24 leaf springs.

15. The aircraft nacelle of claim 11, wherein a portion of a first leaf spring of the plurality of leaf springs is located in closer proximity to the centerline axis than a second leaf spring of the plurality of leaf springs, the second leaf spring being adjacent to the first leaf spring.

\* \* \* \* \*

UNITED STATES PATENT AND TRADEMARK OFFICE
CERTIFICATE OF CORRECTION

PATENT NO. : 10,150,568 B2  
APPLICATION NO. : 15/008123  
DATED : December 11, 2018  
INVENTOR(S) : Jacques Lu Page 1 of 1

It is certified that error appears in the above-identified patent and that said Letters Patent is hereby corrected as shown below:

In Column 8 Line 35 please delete "of the aircraft nacelle of the aircraft nacelle" and therefore please insert -- of the aircraft nacelle --

Signed and Sealed this
Twelfth Day of February, 2019

Andrei Iancu
*Director of the United States Patent and Trademark Office*